United States Patent [19]
Kalinsky

[11] 4,347,558
[45] Aug. 31, 1982

[54] VOLTAGE BALANCE CONTROL FOR SPLIT CAPACITORS IN HALF BRIDGE DC TO DC CONVERTER

[75] Inventor: Wayne A. Kalinsky, Cedar Rapids, Iowa

[73] Assignee: Rockwell International Corporation, El Segundo, Calif.

[21] Appl. No.: 250,520

[22] Filed: Apr. 2, 1981

[51] Int. Cl.³ .................... H02M 3/335; H02P 13/22
[52] U.S. Cl. ........................................ 363/17; 363/98
[58] Field of Search ............................ 363/17, 24–26, 363/56, 98

[56] References Cited
U.S. PATENT DOCUMENTS

| | | | |
|---|---|---|---|
| 3,840,798 | 10/1974 | Burchall et al. | 363/17 |
| 3,859,586 | 1/1975 | Wadlington | 363/56 |
| 4,011,494 | 3/1977 | Saka | 363/17 |
| 4,150,424 | 4/1979 | Nuechterlein | 363/56 |
| 4,291,366 | 9/1981 | Nelson | 363/17 |

OTHER PUBLICATIONS

Elektron, Entwickl., (Germany), vol. 15, No. 10, pp. 46–52, Oct. 1980.
Electronics Industry, vol. 5, No. 4, pp. 25–29, Apr. 1979.

Primary Examiner—William H. Beha, Jr.
Attorney, Agent, or Firm—Richard K. Robinson; Howard R. Greenberg; H. Fredrick Hamman

[57] ABSTRACT

An AC to DC converter that utilizes a split capacitor, half bridge, DC to DC converter compensates for unequal voltages across each member of a split capacitor bank. A voltage balance control circuit senses any differences in voltages across the member capacitors and generates an error correcting signal for modifying steering signals to an inverter that is used to convert a DC signal from the half bridge DC to DC converter to a high frequency pulse width modulated AC signal by alternately placing each member of the split capacitor bank and consequently their stored energy across the output terminals of the inverter. The error signal causes the steering signals to connect the member capacitor with the larger sensed voltage across the output terminals for a relatively larger period of time than the capacitor with the lesser sensed voltage.

4 Claims, 4 Drawing Figures

VOLTAGE BALANCE CONTROL FOR SPLIT CAPACITORS IN HALF BRIDGE DC TO DC CONVERTER

BACKGROUND OF THE INVENTION

This invention relates to DC to DC converters and, in particular, to voltage balance control circuits associated with these converters.

The prior art DC to DC converter circuits implement the function of converting an AC signal to a DC signal by first converting the AC signal to a first DC signal that is then inverted to a high frequency, and generally pulse width modulated, AC signal which is transformer coupled to a second AC to DC converter that converts the high frequency AC signal to the output DC signal. A feedback path monitors the output voltage level and provides pulse width modulated control signals for controlling the inverter.

FIG. 1 is a diagram of the prior art circuits and shows an input AC to DC converter 7, the output of which is applied to an inverter 13. The inverter 13 inverts the DC signal to a high frequency pulse width modulated AC signal which is coupled by the transformer 15 to the output AC to DC converter 17. The inverter controller 19 senses the DC output signal from the output AC to DC converter 17 and compares the sensed DC output signal with an internally generated reference signal. The result of the comparison is an error signal that is used to generate the pulse width modulated control signals for controlling the operation of the inverter 13. The input AC to DC converter 7 is a split capacitor half bridge converter and has associated with it a full wave bridge rectifier, the output of which is applied to two series connected capacitors for filtering.

The basic problem encountered with the converter 7 is the occurrence of a voltage difference across the capicitors. Any imbalance in the power circuits, especially in the reflected impedances created by the transformer 15 on each half cycle, can force either of the capacitors to have a different voltage than the other capacitor. Although the control loop, that includes the inverter controller 19, has an inherent tendency to balance the loading on the capacitors 16 and 18, the imbalanced margin is limited by the transformer 15 saturating if the high frequency voltages should happen to be imbalanced. Although the saturating of the transformer 15 has a balancing effect, there can still be undesirable imbalanced voltages on either capacitor which will result in the inverter 13 switching high currents.

SUMMARY OF THE INVENTION

An AC to DC converter that utilizes a split capacitor, half bridge, DC to DC converter compensates for unequal voltages across each member of a split capacitor bank. A voltage balance control circuit senses any differences in voltages across the member capacitors and generates an error correcting signal for modifying steering signals to an inverter that is used to convert a DC signal from the half bridge DC to DC converter to a high frequency pulse width modulated AC signal by alternately placing each member of the split capacitor bank and consequently their stored energy across the output terminals of the inverter. The error signal causes the steering signals to connect the member capacitor with the larger sensed voltage across the output terminals for a relatively larger period of time than the capacitor with the lesser sensed voltage.

There are two embodiments of the apparatus that senses voltage imbalance between the member capacitors. Each embodiment provides for monitoring the DC voltage across each member of the split capacitor bank. Based upon the sensed voltage, the voltage balance control circuit provides correction to the steering signals that are used to modify the operation of the switches in the inverter stage. The steering signals which act as forcing functions, through pulse width modulation, correct for irregularities in the voltage balance across the split capacitors.

The preferred embodiment uses optical couplers to sense the voltage difference between a node point which is located in the center of the split capacitor bank with a center node point that is located at the center node of a resistor bank that is in parallel alignment with the capacitor bank. The output of the optical couplers are diode ORed together to provide error correcting signals for the steering signals which are used as a forcing function in the pulse width modulation of the DC signal that is being inverted to the high frequency AC signal. Thus, the voltage balance control circuit controls the energy that is transferred from each member of the split capacitor bank to the inverter's output terminals and consequently to a following AC to DC converter by controlling the time period that each member capacitor is connected across the inverter's output terminal.

The alternate embodiment uses a signal transformer to sense peak voltage across each member capacitor of the split capacitor bank. The sensed peak voltage, as in the case of the preferred embodiment, is used as an error correcting signal for modifying the steering signals and consequently the time period that each capacitor is connected across the inverter's output terminal.

It is the object of this invention to provide a method and apparatus for ensuring that the voltages across the split capacitors of a split capacitor half bridge inverter are equal and thus eliminating all undesirable effects due to these voltages being imbalanced.

BRIEF DESCRIPTION OF THE DRAWINGS

The following detailed description will enable the invention to be more fully comprehended. A list of relevant figures accompanies the description in which.

DETAILED DESCRIPTION OF THE DRAWING

Figure 1:
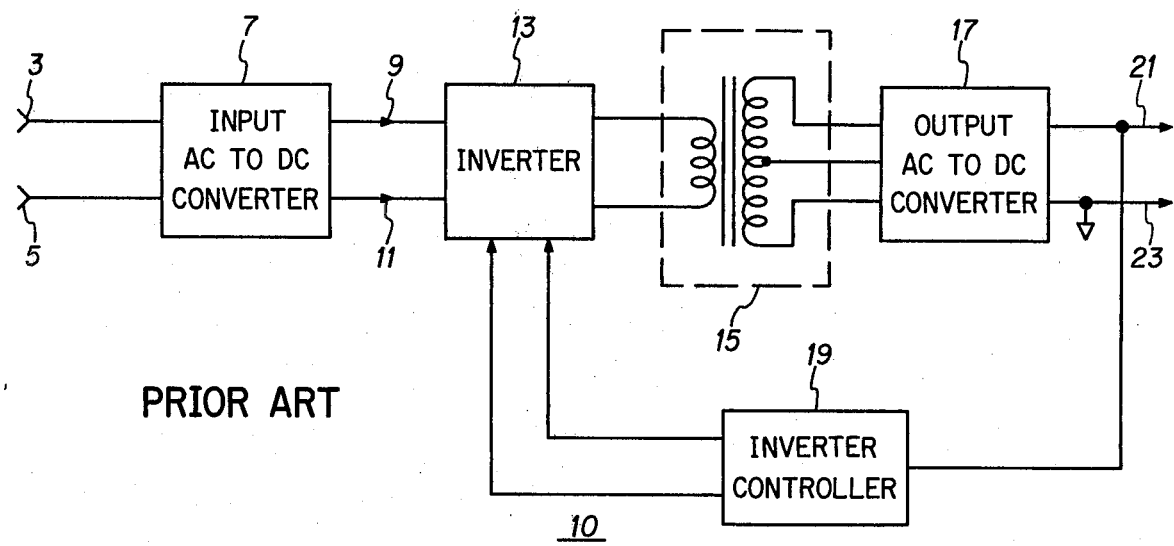
FIG. 1 is a block diagram of a prior art AC to DC converter.
Figure 2:
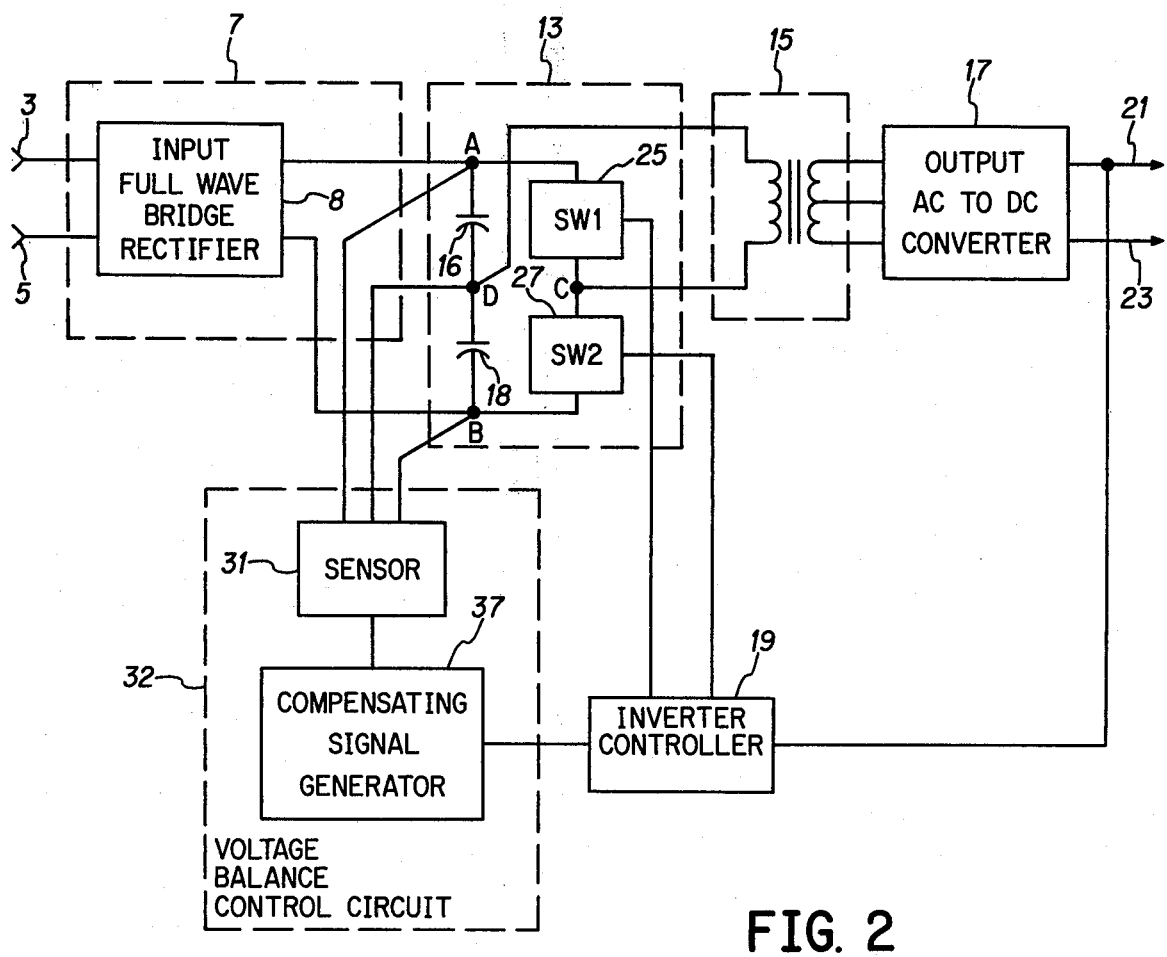
FIG. 2 is a block diagram of an AC to DC converter that has incorporated therein a voltage balance control circuit according to the invention.

In FIG. 2, to which reference should now be made, there is illustrated a block diagram of the AC to DC converter in which there is present across node points A and B a DC signal. The DC signal may be the result of rectification of an AC signal that is applied across the input terminals 3 and 5 by the input full wave bridge rectifier 8 or the application of a DC voltage across node points A and B. Located between node points A and B is a split capacitor bank that includes capacitors 16 and 18 and in combination with SW1 switch 25 and SW2 switch 27 will comprise a split capacitor half bridge inverter. SW1 switch 25 when activated in response to commands from the inverter controller 19 will connect point A to point C and similarly SW2 switch 27 when activated by a command from the inverter controller 19 will connect point B to point C. The primary of the transformer 15 is connected between point D, the center point of the capacitor bank that includes the capacitors 16 and 18, and point C, the node point between SW1 switch 25 and SW2 switch 27. The operation of the inverter controller 19 and the SW1 and SW2 switches will result in a square wave or a modified square wave such as the pulse width modulated square wave being coupled by the transformer action of the transformer 15 to the output AC to DC converter 17. The output AC to DC converter converts the square wave or modified square wave to a DC signal which is provided on the output terminals 21 and 23. Terminal 21 is monitored by the inverter controller 19 which uses the monitored information to generate the pulse width modulated steering signals for controlling the SW1 switch 25 and the SW2 switch 27.

The voltage balance control circuit 32 monitors the voltage across the capacitor 16 and the capacitor 18 via the sensor 31 which is contained within the voltage balance control circuit 32. A compensating signal generator 37, in response to the output signal from the sensor 31, generates a forcing function to which the inverter controller 19 will respond. The inverter controller 19, in response to the forcing function from the compensating signal generator 37, compensates by modifying the operation of the SW1 switch 25 and SW2 switch 27 for any imbalances in the voltage sensed across capacitor 16 and the capacitor 18 by controlling the time period that points A and B are connected to point C and consequently the energy transferred from capacitors 16 and 18 to the output AC to DC converter.

Figure 3:
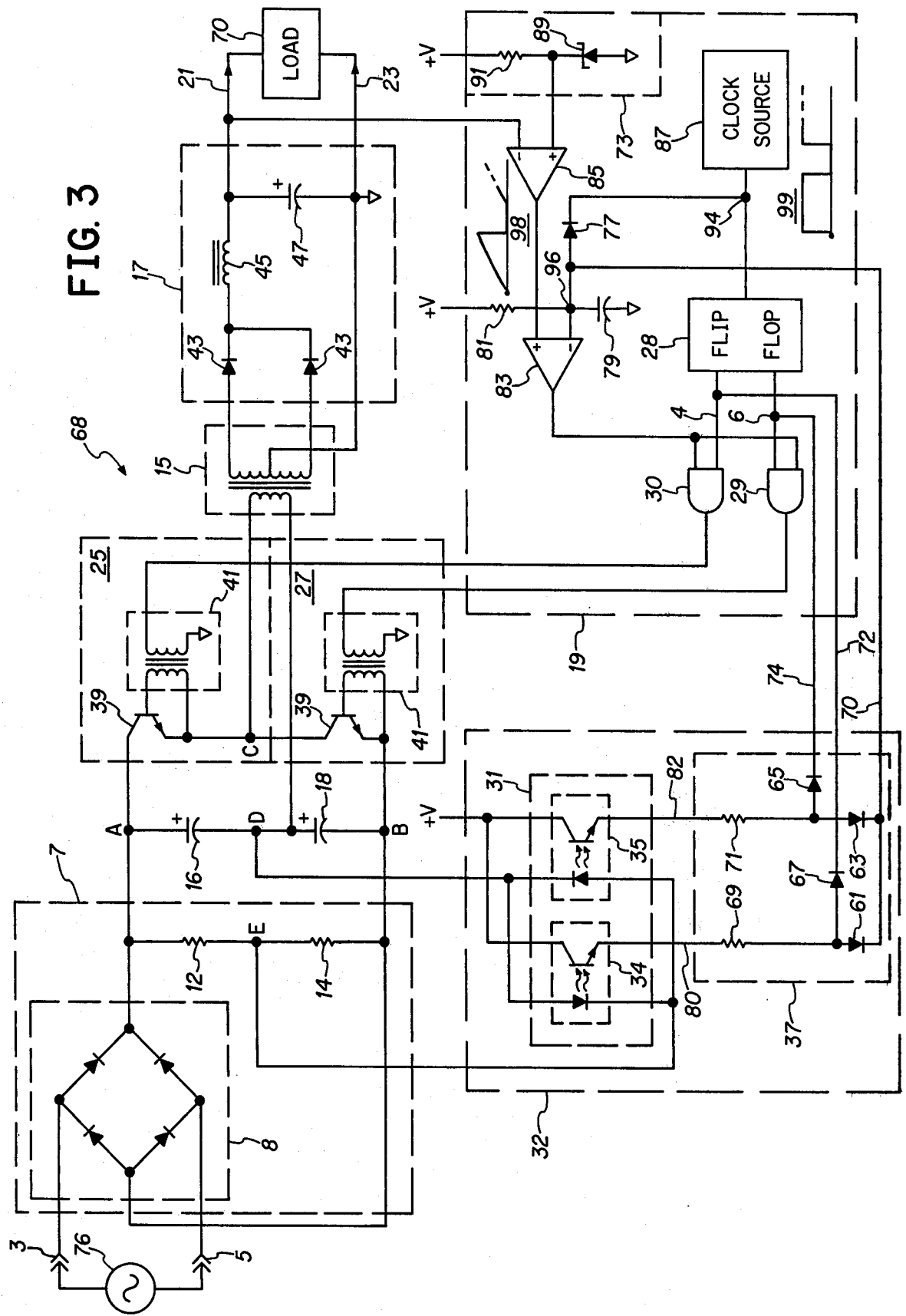
FIG. 3 is a schematic diagram of the preferred embodiment of an AC-to-DC converter according to the invention.

A preferred embodiment of an AC to DC converter that incorporates a DC to DC converter with a voltage balance control circuit is illustrated in FIG. 3. An AC input signal from the AC voltage source 76 is applied by terminals 3 and 5 to the input AC to DC converter 7 which includes an input full wave bridge rectifier 8 which rectifies the AC signal. The rectified AC signal is applied across the split capacitor half bridge inverter 13 that includes the inverter switches 68 and the bank of capacitors 16 and 18. In parallel with the capacitor bank are two series resistors 12 and 14 of identical resistance and, therefore, the voltage at point E should be equal to one-half the voltage between node points A and B and under balance condition equal to the voltage at point D. The output of the input AC to DC converter 7 is applied to the inverter switch 68 which includes the SW1 switch 25 and the SW2 switch 27. Each switch in the preferred embodiment includes a transistor 39 and transformer 41 connected to the base of the transistors for the coupling of commands to the transistors while providing isolation. The outputs from the inverter switch 68 are coupled by transformer 15 to the output AC to DC converter 17. The output AC to DC converter 17 has two diodes 43 which are arranged in a full wave rectifier configuration for rectifying the high frequency signal that is coupled via the transformer 15 from the inverter switches 68 and a filter that includes the choke coil 45 and the capacitor 47 for filtering the rectified signal which is present between conductors 21 and 23 and across the load 70.

The output of the output AC to DC converter 17 is monitored by the inverter controller 19 and in particular by the error amplifier 85 which compares the DC output signal on conductor 21 with a reference source that is provided by the reference source 73. The reference source 73 includes a series connection between a voltage source and a reference potential, such as chassis ground, of a resistor 91 and a zener diode 89 that are selected to establish a DC reference for the error amplifier 85. The output of the error amplifier 85 is applied to the comparator 83. The comparator 83 obtains a comparison between the signal that is provided by error amplifier 85 and a ramp signal that is present at node 96 and generated by the action of the series combination between the voltage source and reference potential of the resistor 81 and the capacitor 79 and the clock output (normally a stream of pulses) from the clock source 87. Waveform 98 illustrates the ramp signal that is present at the node 96 and the waveform 99 illustrates the waveform of the clock signal that is present at the node 94 and provided by the clock source 87. The clock signal also is used to toggle the flip-flop 28 which provides dual square wave outputs that are 180° out of phase on conductors 4 and 6. The square wave signals that are present on conductors 4 and 6 are modulated with the output of the comparator 83 by the AND gates 29 and 30. The outputs of the AND gates 29 and 30 are steering signals and are used to turn on the transistors 39 by applying pulses to the transformer 41 of the SW1 switch 27 and the SW2 switch 25 respectfully.

The voltage at point E is sensed and compared to the sensed voltage at point D by the sensor 31 which includes the optical couplers 34 and 35. The outputs from the optical couplers 34 and 35 are coupled via conductors 80 and 82 respectively to the compensating signal generator 37. The compensating signal generator includes resistors 69 and 71 and the diode OR circuit that is the OR configuration of the diodes 61 and 63. The output from the optical coupler 34 and 35 are ORed together and used as a forcing function to modify the ramp signal that is present at the node 96, the forcing function being connected to node 96 by conductor 70. In addition, balancing signals are provided to modify the steering signals that control the SW1 switch 25 or SW2 switch 27 and compensate thereby for any voltage imbalance that is detected across the capacitor bank that includes the capacitors 16 and 18. Diode 65 interfaces one output from the sensor 31 and optical coupler 35 via conductor 82 and resistor 71 to the input to the AND gate 29 via conductor 74 and diode 67 connects the output from the sensor 31 and optical coupler 34 via conductor 80, via resistor 69 to the input of the AND gate 30 via conductor 72. Thus any difference that is detected between point E and point D is used to modify both the ramp signal that is present at point 96 and steering signals that are provided by the AND gates 29 and 30. The overall result being that the time that either the SW1 switch 25 or SW2 switch 27 are turned on and connecting either node point A or B to node point C thereby is modified so that the voltage balance across the capacitors, through the transfer of excess energy from the appropriate capacitor to the output AC to DC converter via transformer 15, is maintained.

Figure 4:
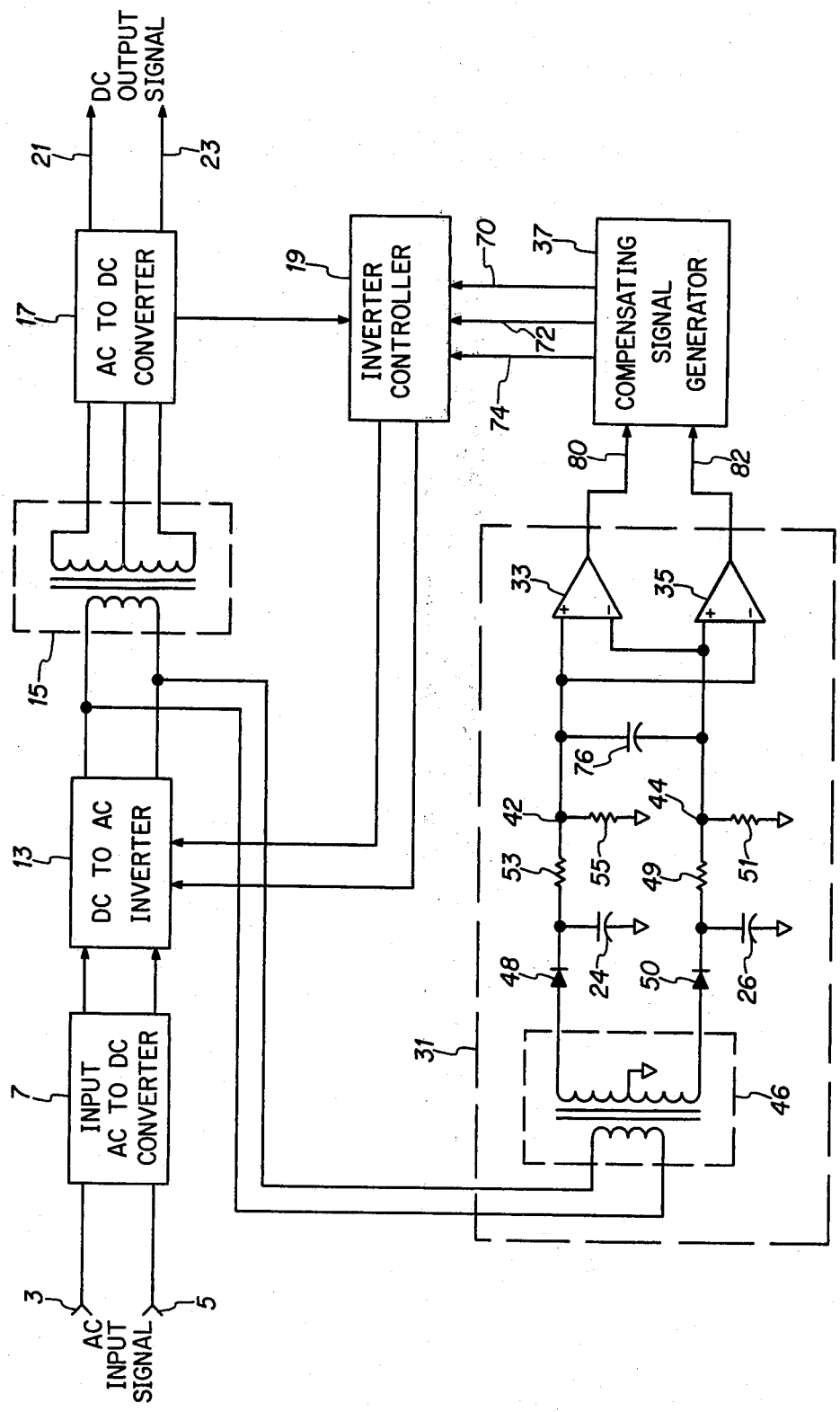
FIG. 4 is a schematic diagram of one embodiment of the AC to DC converter according to the invention.

An alternate embodiment of the invention is provided in FIG. 4, to which reference should now be made. The sensor 31 includes a sensing transformer 46 that is connected in parallel arrangement with the transformer 15. The sensing transformer 46 senses the peak voltages that occur due to the switching actions of the SW1 switch 25 and the SW2 switch 27. The sensed peak voltages are applied to a filtering and amplifier circuit after being rectified by the diodes 48 and 50. The filter circuit includes capacitors 24, 26 and 76. The sensed peak voltage is, in the embodiment illustrated in FIG. 4, reduced in amplitude by two resistor divider networks. Resistors 53 and 55 are one divider network and resistors 49 and 51 are the other divider network. The amplifiers 33 and 35 will, under balanced conditions, have a nulled output. However, imbalances in the voltages that are detected across capacitor 16 and capacitor 18 will result in these errors being amplified by the amplifiers 33 and 35 and used to drive via conductors 80 and 82 a compensating signal generator circuit 37, such as that illustrated in FIG. 3, to provide corrections for any sensed imbalances to the inverter controller 19 which drives the inverter switches SW1 switch 25 or SW2 switch 27. The operation of the switches as controlled by the inverter controller 19 will vary the period of time that either node point A or node point B (FIGS. 2 and 3) are connected to node point C and consequently the amount of energy that is transferred and coupled by the transformer 15 to the AC to DC converter 17 and thus ensure that a voltage balanced condition is maintained between the capacitors 16 and 18.

Many changes and modifications in the above described embodiments of the invention can, of course, be carried out without departing from the scope thereof. Accordingly, to promote the progress of science and the useful arts, the invention is disclosed, and is intended to be limited only by the scope of the pending claims.

I claim:

1. A DC to DC converter, comprising:
 a DC to AC inverter means for inverting a first signal to obtain a second signal including a bridge network with a series connection of a first capacitor connected to a second capacitor at a first node, a first switch connected to the second capacitor at a second node, a second switch connected to the first switch at a third node, and a fourth node that connects the second switch to the first capacitor;
 output AC to DC converter means for converting the second signal into a third signal;
 transformer means for coupling the second signal from the inverter means to the output AC to DC converter means, a primary of which is connected between the first and third nodes and the secondary is connected across the input to the output AC to DC converter;
 control signal generator means for generating a first control signal for controlling the first switch and a second control signal for controlling the second switch such that, when activated, the first switch places the first capacitor electrically across the primary winding and when activated the second switch places the second capacitor electrically across the primary winding; and
 voltage balance control means for sensing a voltage imbalance across the first and second capacitors and for modifying the operation of the control signal generator means in response to a sensed voltage imbalance to cause the inverter means to compensate for the sensed voltage imbalance.

2. The DC to DC converter means according to claim 1 further comprising an input AC to DC converter means electrically connected in cascade arrangement with the DC to AC inverter means for providing the first signal.

3. The DC to DC converter according to claims 1 or 2 wherein the voltage balance control means comprises:
 a sensor and comparator means for sensing a first voltage across the first capacitor and a second voltage across the second capacitor, and for providing a difference signal representing the voltage imbalance; and
 A compensating signal source for providing, in response to the difference signal, compensating signals to which the control signal generator means responds such that the first control signal and the second control signal control the first switch and second switch to compensate for the voltage imbalance.

4. A method of converting a first DC signal to a second DC signal, comprising:
 inverting a first signal to obtain a second signal including the step of passing the first signal through a bridge network having a series connection of a first capacitor connected to a second capacitor at a first node, a first switch connected to the second capacitor at a second node, a second switch connected to the first switch at a third node, and a fourth node that connects the second switch to the first capacitor;
 coupling the second signal from the first and third nodes to an input terminal of an output AC to DC converter;
 converting the second signal into a third signal; and
 generating a first control signal for controlling the first switch and a second control signal for controlling the second switch such that, when activated, the first switch places the first capacitor electrically across the input terminal and when activated the second switch places the second capacitor electrically across the input terminal sensing a voltage imbalance across the first and second capacitors, modifying the operation of the control signal generator means in response to a sensed voltage imbalance to cause the inverter means to compensate for the sensed voltage imbalance.

* * * * *